United States Patent [19]

Traina

[11] 4,016,424
[45] Apr. 5, 1977

[54] ULTRAVIOLET RADIATION DETECTOR

[75] Inventor: Richard Traina, Randolph Township, N.J.

[73] Assignee: Alison Control Inc., Fairfield, N.J.

[22] Filed: Oct. 20, 1975

[21] Appl. No.: 623,809

[52] U.S. Cl. .............................. 250/372; 250/374
[51] Int. Cl.² ..................................... G01J 1/42
[58] Field of Search ......................... 250/372, 374

[56] References Cited

UNITED STATES PATENTS

| | | | |
|---|---|---|---|
| 3,493,753 | 2/1970 | Stowe | 250/372 |
| 3,825,760 | 7/1974 | Fletcher et al. | 250/372 |
| 3,917,948 | 11/1975 | Strutz | 250/372 |

*Primary Examiner*—Archie R. Borchelt
*Attorney, Agent, or Firm*—Rudolph J. Jurick

[57] ABSTRACT

A system for detecting ultraviolet (UV) radiations and particularly adapted for the detection of fire. Electrical pulses are produced at a rate proportional to the intensity of UV energy received by a UV detector tube. An alarm and/or control function is actuated only when the tube pulse rate and pulse rate duration correspond to predetermined values. In addition, the alarm and/or control function is inhibited when the detector tube is exposed to non-fire created UV energy.

2 Claims, 1 Drawing Figure

U.S. Patent
April 5, 1977
4,016,424
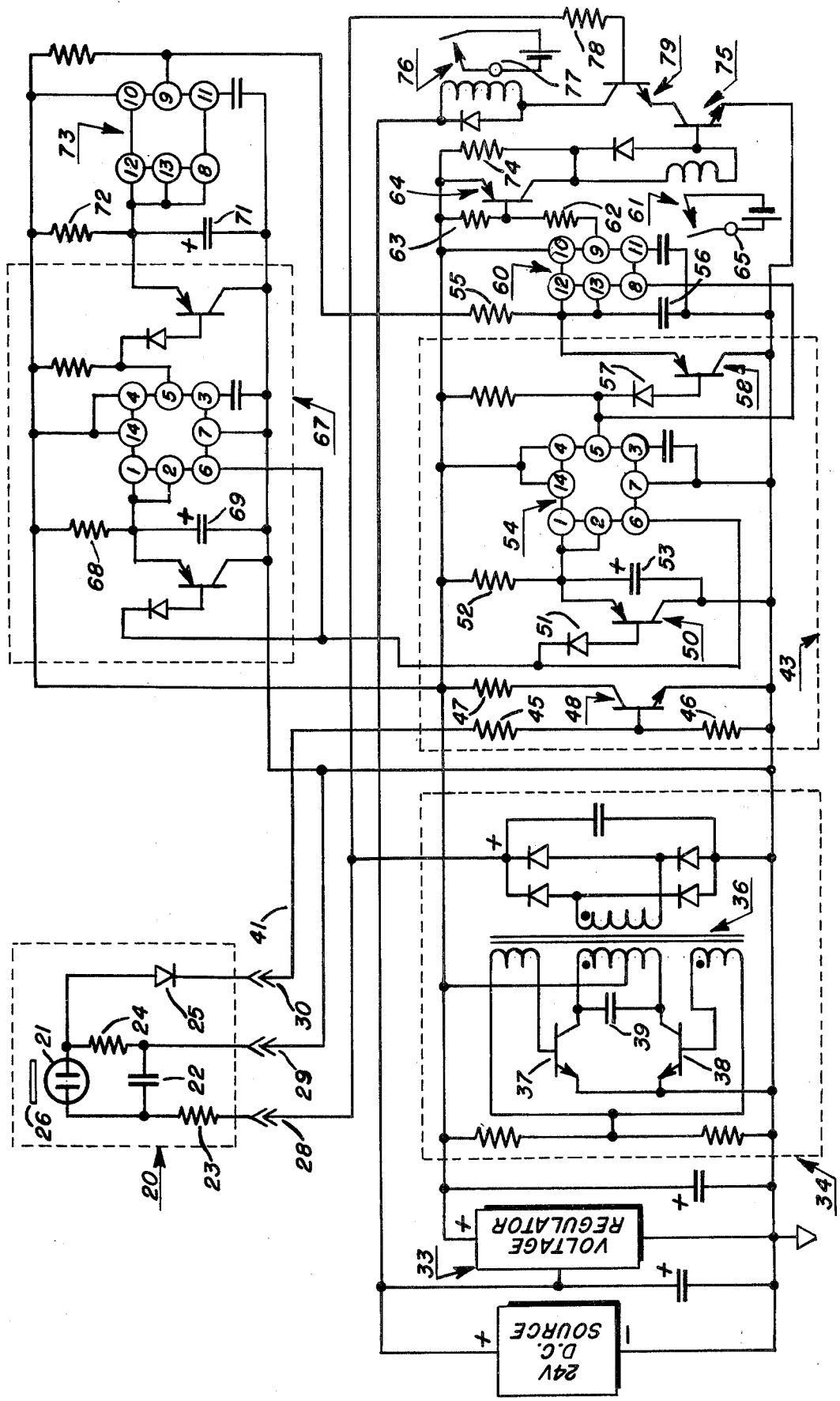

ULTRAVIOLET RADIATION DETECTOR

BACKGROUND OF THE INVENTION

Fire alarm systems utilizing a UV detector tube as the fire sensor are well known. In many of the prior systems the UV detector tube is operated in the normal on-off manner and, consequently, such systems cannot distinguish between fires of different sizes or fires located at different distances from the tube. Also, many prior systems cannot distinguish between UV radiations emitted by a fire and those emitted by sources other than a fire. It is important to eliminate false alarms particularly in systems which automatically actuate fire extinguishers. A particularly troublesome cause of false alarms in existing systems in an electrical welding arc as such arc emits massive amounts of non-flickering UV radiations. Also, lightning flashes may cause the system to give a false alarm even though the resulting UV radiations are of relatively short duration.

An ultraviolet fire detection system made in accordance with this invention distinguishes between fire and other sources producing UV radiations. Also, the system is programmable to detect a fire of predetermined size located a predetermined distance from the UV detector tube, and, the system does not respond to high level, constant UV radiations produced by a welding arc.

SUMMARY OF THE INVENTION

A UV detector tube is energized by an energy limited voltage source which causes the tube to emit electrical pulses at a rate proportional to the intensity of UV energy striking the cathode of the tube. The tube output pulses are applied to circuitry programmed to respond to a predetermined pulse rate and pulse rate duration. An alarm system is actuated only when the rate and duration of the tube output pulses correspond to the programmed values. Other circuitry responds to a predetermined high pulse output rate from the tube. A derivative circuit is responsive to the rate of change of such high pulse rate and inhibits the operation of the alarm system when the first derivative of the pulse rate is zero.

An object of this invention is the provision of a UV detection system which is responsive only to UV radiations of predetermined intensity.

An object of this invention is the provision of a UV fire detection system which discriminates between UV radiations received from a fire and those received from other sources of such radiations.

An object of this invention is the provision of a UV fire detection system programmable for detection of fires of predetermined size and/or located a predetermined distance from a UV detector tube.

An object of this invention is the provision of a UV fire detection system which does not respond to UV radiations having a high, constant energy level.

An object of this invention is the provision of a fire detection system having a UV detector tube as the fire-sensor, means causing the tube to emit electrical pulses at a rate proportional to photon energy, and means actuating an alarm when the rate and rate duration of the pulses correspond to predetermined values.

The above-stated and other objects and advantages of the invention will become apparent from the following description when taken with the accompanying drawing. It will be understood, however, that the drawing is for purposes of illustration and is not to be construed as defining the scope or limits of the invention, reference being had to the latter purpose to the claims appended hereto.

BRIEF DESCRIPTION OF THE DRAWING

The single FIGURE of the drawing is a circuit diagram of apparatus made in accordance with this invention.

DESCRIPTION OF PREFERRED EMBODIMENT

The invention will be described with specific reference to a fire detection system but it will be apparent the system has a broader field of application.

Referring now to the drawing, the reference numeral 20 identifies a detector module comprising a Geiger-Mueller tube 21, a capacitor 22, resistors 23, 24 and a voltage isolating diode 25. The UV detector tube 21 has a tungsten cathode to provide an upper radiation wavelength cutoff level at 2450 Angstroms. Also, the tube is provided with a quartz viewing window indicated by the reference numeral 26, which window does not pass radiation wavelengths shorter than 2000 Angstroms. Thus, the response of the tube is restricted to a range of 2000–2450 Angstroms. This wavelength restriction renders the system insensitive to visible radiation and prevents shorter wavelength, non-fire created ultraviolet radiation from actuating an alarm. The detector module is connectable to the electronic circuitry as by means of three, conventional plug-type connectors identified by the numerals 28, 29 and 30.

The detection system can be energized by a conventional 120 volt, 60 Hz. power line through a step down transformer and rectifier arrangement. Alternatively, the system can be energized by 24 volts d.c. as shown in the drawing, such voltage normally being available in most industrial locations and particularly in aircraft hangars. A voltage regulator 33 converts the unregulated 24 volt input to a regulated output of 15 volts which is applied to various components of the circuitry including an energy limited power supply enclosed within the dotted line identified by the numeral 34. This power supply comprises an inductance limited coupling transformer 36, transistors 37, 38 and a capacitor 39 which form a magnetically coupled astable multivibrator. The power supply provides a 290 volt d.c. output voltage which is applied to the electrodes of the detector tube 21. The capacitor 22 is charged to a normal 290 volts d.c. while the detector tube is non-conducting. A photon of ultraviolet radiation causes the tube to conduct, thereby discharging the capacitor through the tube and the resistor 24 and resulting in an output voltage pulse appearing on the lead 41. The energy-limited power supply cannot maintain the tube in conduction and the tube shuts off, thereby terminating the output pulse and allowing the capacitor 22 to recharge in preparation for the next pulse.

The energy level of a photon is dependent upon the wavelength of the carrier radiation, with energy being inversely proportional to wavelength. When a photon of radiation strikes the cathode of the detector tube its total energy is transferred to a single electron. If this energy is of a sufficient level the electron is liberated from the cathode and is accelerated toward the anode resulting in ionization of a molecule of the gas by collison. The molecules of the gas emit an electron everytime they are struck by a liberated electron, thereby causing a self-propogating electron avalanche to occur.

Until a discharge occurs, the capacitor 22 is charged to the potential of power supply 34. As soon as the electron avalanche occurs the capacitor begins to discharge through the tube and such discharge continues until the voltage on the capacitor falls to a level below the sustaining voltage for the tube. When this occurs the discharge is extinguished and the voltage of the capacitor builds up again in a time period determined by the values of the capacitor 22 and the resistor 24. This automatic action results in a typical voltage output pulse having an amplitude of 10 volts minimum, a 30 microsecond duration and a 2 microsecond rise time. These output pulses are applied to the remainder of the circuitry to generate a fire alarm condition, as will be described in detail hereinbelow.

The sensitivity of the detector tube being a characteristic of its cathode material is fixed but its voltage pulse output rate varies both with flame size and flame viewing distance. The pulse rate output is directly proportional to the size of the flame front and inversely proportional to the distance of the flame front from the detector tube. As an example, a one square foot hydrocarbon fire will cause a pulse output rate of 15 pulses per second at a viewing distance of 40 feet. The same fire will cause a pulse output rate of 65 pulses per second at a viewing distance of 25 feet.

The output pulses of the tube 21 are applied to a normal pulse rate alarm circuit enclosed by the dotted line identified by the reference numeral 43. Resistors 45, 46, 47 and transistor 48 form a pulse amplifier which delivers high rise-time, constant amplitude pulses to the capacitor discharge transistor 50 through a coupling diode 51. The values of the resistor 52 and the capacitor 53 are selected to have an RC time constant such that one time-constant period is equivalent to the inverse of the desired pulse rate alarm setpoint. The instantaneous voltage level at the junction of resistor 52 and capacitor 53 is monitored by a conventional integrated comparator network identified by the numeral 54. As long as no detector output pulses are present, the junction point voltage passes through the comparator setpoint and the output of the comparator falls from a high voltage to a low voltage. This action internally resets the time constant generator (resistor 52 and capacitor 53) and also externally resets the pulse rate duration timer (resistor 55 and capacitor 56) through coupling diode 57 and discharger transistor 58. When detector output pulses are present, the voltage at the junction of resistor 52 and capacitor 53 is terminated externally by transistor 50 at levels dependent upon pulse rate, with the average voltage moving closer to the comparator setpoint as pulse rate increases. When the detector tube pulse output rate exceeds the pulse rate setpoint, the voltage of the resistor-capacitor junction cannot rise above the comparator threshhold and the comparator output switches state to a low value. This action allows the voltage at the junction of the resistor 55 and capacitor 56 to rise toward the threshhold of its comparator 60 without being discharged by external transistor 58. The time constant of resistor 55 and capacitor 56 is chosen to be equal to the time the alarm pulse output rate must be maintained to generate an alarm condition. As long as the detector tube pulse output rate is above the alarm level the duration timer (resistor 55 and capacitor 56) can charge toward its threshhold level. When the threshhold level of the comparator 60 is exceeded, alarm relay 61 is energized through resistors 62 and 63 and transistor 64, thereby resulting in the actuation of a suitable alarm 65. If at any time during the alarm period (time constant of resistor 55 and capacitor 56) the detector tube pulse output rate falls below the alarm level the duration timer is immediately reset by the action of transistor 58 in response to the comparator 54 and a new duration period is initiated.

The rejection of constant high intensity ultraviolet energy, as is emitted by welding arcs, is accomplished by two circuits which inhibit the alarm duration timer (resistor 55 and capacitor 56) when the detector tube emits pulses at a very high, non-changing output rate. The first of these two determinations, namely, high pulse rate output, is made by a circuit shown enclosed within the dotted line 67. Such circuit is identical in all respects to the normal pulse rate alarm circuit 43 with the exception that the alarm pulse rate established by the time constant of resistor 68 and capacitor 69 is of the order of 250 pulses per second. Once a high pulse rate has been established, capacitor 71 is free to charge through the resistor 72. As long as the detector tube pulse output rate is constant and above the high pulse output rate threshhold, a fact that is determined by internally-biased comparator 73, the output of the comparator is maintained at a low level and the alarm circuit is inhibited. Any decrease in the pulse output rate of the detector tube releases the inhibit on the alarm circuit permitting response if the tube output continues to change for a period of one alarm pulse rate duration.

In order to assure proper circuit operation it is desirable to monitor four key areas and to annunciate any failure in such areas. The critical areas are (1), presence of the high voltage detector tube operating potential, (2), presence of the voltage regulator output, (3), detector tube integrity and (4), alarm relay coil continuity. The reliability of the remaining components is sufficiently high to insure a reasonably long operating life. The continuity of the coil of the alarm relay 61 is monitored by circulating a small current through resistor 74 and through the coil to the base emitter junction of transistor 75. This current, though sufficiently small in magnitude to prevent the development of inadvertent operating potential across the relay coil, mantains transistor 75 turned on. If this current should diminish either through a failure in voltage regulator 33 or the alarm relay coil, transistor 75 will turn off thereby deenergizing relay 76. The relay 76 normally is energized causing the actuation of a suitable indicator 77. The integrity of the high voltage power supply 34 and of the detector tube 21 is verified by resistor 78 and transistor 79, one side of this resistor being connected to the high potential side of the tube module at the plug-connector 28. A trickle current flows through the resistor 78 as long as the high voltage is present or as long as the tube is not shorted. This trickle current maintains transistor 79 turned on. A failure of the high voltage supply, or shorting of the detector tube causes the trickle current to cease and transistor 79 shuts off. This action results in the deenergization of the relay 76 and the deactuation of the indicator 77.

Having now described the invention what I desire to protect by letters patent is set forth in the following claims.

I claim:

1. A UV detection system comprising,
  a. a Geiger-Mueller tube having anode and cathode elements, b. an energy-limited voltage supply circuit for said tube connected between the said elements, c. a limited energy storage network connected across the tube elements, which network in conjunction with said energy-limited supply circuit causes the tube to develop output voltage pulses having a rate directly proportional to the magnitude of photon energy and inversely proportional to the distance of the tube from a source of UV radiations, d. means applying the tube output pulses to a normal pulse rate alarm circuit producing an output when a first predetermined pulse rate is exceeded, e. a duration circuit responsive to the output of said normal pulse rate alarm circuit and providing an output voltage when the said first predetermined pulse rate has been exceeded for a predetermined time period, f. alarm means actuated by the said output voltage, g. a high pulse rate alarm circuit producing an output when a second predetermined pulse rate is exceeded, which second pulse rate is substantially higher than said first predetermined pulse rate, h. means applying the tube output pulses to said high pulse rate alarm circuit, i. a differentiating circuit imitiated by the output of said high pulse rate alarm circuit, said differentiating circuit providing an output voltage only when the first derivative of the tube pulse rate is zero, and j. means responsive to the output voltage of said differentiating circuit and inhibiting actuation of said alarm means.

2. A system as recited in claim 1, including means restricting the response of said tube to radiations having a wavelength of 2000–2450 Angstroms.

* * * * *